United States Patent
Han et al.

(10) Patent No.: US 9,530,212 B2
(45) Date of Patent: Dec. 27, 2016

(54) IMAGE FRAME CONVERSION METHOD AND VIDEO FRAME CONVERSION METHOD AND APPARATUS

(71) Applicant: Huawei Technologies Co., Ltd., Shenzhen, Guangdong (CN)

(72) Inventors: Mingchen Han, Shenzhen (CN); Cheolkon Jung, Xi'an (CN); Lei Wang, Xi'an (CN); Biao Hou, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 14/573,345

(22) Filed: Dec. 17, 2014

(65) Prior Publication Data

US 2015/0178933 A1   Jun. 25, 2015

(30) Foreign Application Priority Data

Dec. 20, 2013 (CN) .......................... 2013 1 0712466

(51) Int. Cl.
  *G06T 15/00* (2011.01)
  *G06T 7/00* (2006.01)
  *G06T 5/00* (2006.01)

(52) U.S. Cl.
  CPC ............. *G06T 7/0051* (2013.01); *G06T 5/002* (2013.01); *G06T 7/0071* (2013.01);
  (Continued)

(58) Field of Classification Search
  CPC ..................................... H04N 13/026–13/0267
  See application file for complete search history.

(56) References Cited

U.S. PATENT DOCUMENTS

| | | | | |
|---|---|---|---|---|
| 4,942,533 A | * | 7/1990 | Kakinami | ............... G01S 11/12 340/937 |
| 2010/0014781 A1 | | 1/2010 | Liu et al. | |

(Continued)

FOREIGN PATENT DOCUMENTS

| CN | 1945629 A | 4/2007 |
|---|---|---|
| CN | 101640809 A | 2/2010 |

(Continued)

OTHER PUBLICATIONS

Battiato et al, "3D Stereoscopic Image Pairs by Depth-Map Generation", Proceedings of the 2nd International Symposium on 3D Data Processing, Visualization, and Transmission (3DPVT'04), IEEE, 2004, 8 pages.*

(Continued)

*Primary Examiner* — Brian P Werner
(74) *Attorney, Agent, or Firm* — Leydig, Voit & Mayer, Ltd.

(57) ABSTRACT

An image frame conversion method and a video frame conversion method and apparatus are provided. The video frame conversion method includes: extracting a longest line segment of a 2D video frame; determining a first depth image of the 2D video frame according to a direction of the longest line segment; determining motion information of the 2D video frame according to a video frame adjacent to the 2D video frame; determining a second depth image of the 2D video frame according to the motion information; and generating, according to the first depth image, the second depth image, and the 2D video frame, a 3D video frame corresponding to the 2D video frame.

18 Claims, 9 Drawing Sheets

(52) U.S. Cl.
   CPC .. *G06T 7/0079* (2013.01); *G06T 2207/10016* (2013.01); *G06T 2207/20021* (2013.01)

(56) References Cited

U.S. PATENT DOCUMENTS

| | | |
|---|---|---|
| 2010/0026784 A1 | 2/2010 | Burazerovic |
| 2011/0096832 A1 | 4/2011 | Zhang et al. |
| 2011/0115790 A1 | 5/2011 | Yoo et al. |
| 2011/0141237 A1 | 6/2011 | Cheng et al. |
| 2011/0188780 A1* | 8/2011 | Wang .............. G06T 7/0059 382/293 |
| 2012/0056871 A1 | 3/2012 | Chen |
| 2013/0076873 A1 | 3/2013 | Oshikiri |

FOREIGN PATENT DOCUMENTS

| | | |
|---|---|---|
| CN | 101840574 A | 9/2010 |
| CN | 102124745 A | 7/2011 |
| CN | 102223553 A | 10/2011 |
| CN | 102469323 A | 5/2012 |
| EP | 2175664 A1 | 4/2010 |
| JP | 201370267 A | 4/2013 |
| KR | 101225659 B1 | 1/2013 |
| WO | WO 2011037645 A1 | 3/2011 |

OTHER PUBLICATIONS

Chao-Chung Cheng et al., "A Block-based 2D-to-3D Conversion System with Bilateral Filter", IEEE publication, 2009, 2 pages.*

Yong Ju Jung et al., "A novel 2D-to-3D conversion technique based on relative height depth cue", Proceedings of SPIE-IS&T Electronic Imaging, SPIE vol. 7237, 72371U, 2009 SPIE-IS&T, pp. 1-8.*

Ping, "Research on Depth Extraction for 2D to 3D Video Conversion," A Dissertation Submitted to Shanghai University for the Degree of Master in Engineering (Feb. 2012).

Yu, "Research on Depth Generation Methods for 2D-3D Conversion" (Feb. 15, 2013).

"2D to 3D Conversion in 3DTV Based on Hybrid Depth Cues and Depth-Image-Based Rendering," Master Thesis Xidian University.

Fehn, "A 3D-TV Approach Using Depth-Image-Based Rendering (DIBR)," Proceedings of Visualization, Imaging and Image Processing Conference, Benalmadena, Spain, pp. 482-487, ACTA Press, Calgary, Canada (Sep. 8-10, 2003).

Kim et al., "A Stereoscopic Video Generation Method Using Stereoscopic Display Characterization and Motion Analysis," IEEE Transactions on Broadcasting, vol. 54, No. 2, pp. 188-197, Institute of Electrical and Electronics Engineers, New York, New York (Jun. 2008).

Tao et al., "SimpleFlow: A Non-iterative, Sublinear Optical Flow Algorithm," Eurographics 2012, Computer Graphics Forum, vol. 31, No. 2, pp. 345-353, Blackwell Publishing, Oxford, UK (2012).

Zhang et al., "Visual Pertinent 2D-to-3D Video Conversion by Multi-Cue Fusion," Proceedings of the 18th IEEE International Conference on Image Processing, Brussels, Belgium, pp. 909-912, Institute of Electrical and Electronics Engineers, New York, New York (Sep. 11-14, 2011).

Cheng et al., "A Novel 2D-to-3D Conversion System Using Edge Information," IEEE Transactions on Consumer Electronics, vol. 56, No. 3, pp. 1739-1745, Institute of Electrical and Electronics Engineers, New York, New York (Aug. 2010).

Lin et al., "2D to 3D Image Conversion Based on Classification of Background Depth Profiles," Proceedings of the 5th Pacific Rim Symposium, Part II, LNCS 7088, pp. 381-392, Springer-Verlag, Berlin, Germany (Nov. 20-23, 2011).

* cited by examiner

IMAGE FRAME CONVERSION METHOD AND VIDEO FRAME CONVERSION METHOD AND APPARATUS

CROSS-REFERENCE TO RELATED APPLICATIONS

This application claims priority to Chinese Patent Application No. 201310712466.X, filed on Dec. 20, 2013, which is hereby incorporated by reference in its entirety.

TECHNICAL FIELD

The present invention relates to the image processing field, and in particular, to an image frame conversion method and a video frame conversion method and apparatus.

BACKGROUND

A 3D technology can present things in a real world to people with a more realistic effect. However, in comparison with 3D display hardware devices, an amount of 3D content is apparently insufficient. Although a 3D device may be used to photograph 3D content, a problem of insufficiency of 3D resources can be effectively solved undoubtedly if abundant existing 2D resources can be converted into 3D resources.

Currently, a depth image based 3D synthesis technology is a more mainstream 2D-to-3D conversion technology. This technology mainly uses a psychological stereoscopic vision of human eyes, which is formed by human visual experience and visual memory during 2D-to-3D conversion. In a 2D image, there are depth cues, such as motion parallax, focusing/defocusing, linear perspective, atmospheric scattering, shadow, blocking, relative height, and relative size. By analyzing these depth cues, depth information in the 2D image may be estimated, and therefore, a corresponding depth image is generated according to the estimated depth information. According to an original view and a depth image corresponding to the original view and by using a depth image based rendering (Depth image based rendering, DIBR) technology, a virtual left view and right view may be synthesized; and by merging the left view and right view and by using a 3D display device, a stereoscopic image having a 3D effect may be obtained.

With maturity of the DIBR technology, the depth image based 3D synthesis technology is extensively studied, and how to accurately estimate depth information of a 2D image becomes crucial to the technology.

SUMMARY

Technical Problem

In view of this, a technical problem to be solved by the present invention is how to accurately estimate depth information of a 2D image, so as to improve the authenticity of a depth image obtained by using the 3D synthesis technology based on the depth information.

Solution

To solve the foregoing technical problem, according to an embodiment of the present invention, in a first aspect, an image frame conversion method is provided and includes:
extracting a longest line segment of a 2D image frame;
determining a first depth image of the 2D image frame according to a direction of the longest line segment; and
generating, according to the first depth image and the 2D image frame, a 3D image frame corresponding to the 2D image frame.

With reference to the first aspect, in a possible implementation manner, the extracting a longest line segment of a 2D image frame includes:
performing smooth denoising on the 2D image frame by bilateral filtering; and
detecting the bilaterally filtered 2D image frame by using a Hough transform technology, so as to extract the longest line segment of the 2D image frame.

With reference to the first aspect, in a possible implementation manner, the determining a first depth image of the 2D image frame according to a direction of the longest line segment includes:
determining, according to the direction of the longest line segment, a depth transform direction of an initial depth template corresponding to the 2D image frame;
dividing the bilaterally filtered 2D image frame into blocks, and grouping and clustering block division results; and
obtaining the first depth image based on the initial depth template and according to the depth transform direction and grouping and clustering results.

With reference to the first aspect, in a possible implementation manner, the determining, according to the direction of the longest line segment, a depth transform direction of an initial depth template corresponding to the 2D image frame includes:
establishing a plane rectangular coordinate system by using any point in the bilaterally filtered 2D image frame as an origin, a horizontal rightward direction of the bilaterally filtered 2D image frame as a positive direction of an x-axis, and a vertical downward direction thereof as a positive direction of a y-axis;
if an angle between the longest line segment towards a clockwise direction and the positive direction of the x-axis falls within a first range of (112.5°, 157.5°) or (292.5°, 337.5°), determining that the depth transform direction is a gradient direction of transform from lower left to upper right of the bilaterally filtered 2D image frame;
if the angle between the longest line segment towards the clockwise direction and the positive direction of the x-axis falls within a second range of (22.5°, 67.5°) or (202.5°, 247.5°), determining that the depth transform direction is a gradient direction of transform from lower right to upper left of the bilaterally filtered 2D image frame; and
if the angle between the longest line segment towards the clockwise direction and the positive direction of the x-axis does not fall within the first range and second range, determining that the depth transform direction is a gradient direction of transform from bottom to top of the bilaterally filtered 2D image frame.

With reference to the first aspect, in a possible implementation manner, after the obtaining the first depth image based on the initial depth template and according to the depth transform direction and grouping and clustering results, the method further includes:
obtaining the first depth image by cross bilateral filtering.

To solve the foregoing technical problem, according to another embodiment of the present invention, in a second aspect, a video frame conversion method is provided and includes:
extracting a longest line segment of a 2D video frame;
determining a first depth image of the 2D video frame according to a direction of the longest line segment;

determining motion information of the 2D video frame according to a video frame adjacent to the 2D video frame;

determining a second depth image of the 2D video frame according to the motion information; and generating, according to the first depth image, the second depth image, and the 2D video frame, a 3D video frame corresponding to the 2D video frame.

With reference to the second aspect, in a possible implementation manner, the extracting a longest line segment of a 2D video frame includes:

performing smooth denoising on the 2D video frame by bilateral filtering; and detecting the bilaterally filtered 2D video frame by using a Hough transform technology, so as to extract the longest line segment of the 2D video frame.

With reference to the second aspect, in a possible implementation manner, the determining a first depth image of the 2D video frame according to a direction of the longest line segment includes:

determining, according to the direction of the longest line segment, a depth transform direction of an initial depth template corresponding to the 2D video frame;

dividing the bilaterally filtered 2D video frame into blocks, and grouping and clustering block division results; and obtaining the first depth image based on the initial depth template and according to the depth transform direction and grouping and clustering results.

With reference to the second aspect, in a possible implementation manner, the determining, according to the direction of the longest line segment, a depth transform direction of an initial depth template corresponding to the 2D video frame includes:

establishing a plane rectangular coordinate system by using any point in the bilaterally filtered 2D video frame as an origin, a horizontal rightward direction of the bilaterally filtered video frame as a positive direction of an x-axis, and a vertical downward direction thereof as a positive direction of a y-axis;

if an angle between the longest line segment towards a clockwise direction and the positive direction of the x-axis falls within a first range of (112.5°, 157.5°) or (292.5°, 337.5°), determining that the depth transform direction is a gradient direction of transform from lower left to upper right of the bilaterally filtered 2D video frame;

if the angle between the longest line segment towards the clockwise direction and the positive direction of the x-axis falls within a second range of (22.5°, 67.5°) or (202.5°, 247.5°), determining that the depth transform direction is a gradient direction of transform from lower right to upper left of the bilaterally filtered 2D video frame; and if the angle between the longest line segment towards the clockwise direction and the positive direction of the x-axis does not fall within the first range and second range, determining that the depth transform direction is a gradient direction of transform from bottom to top of the bilaterally filtered 2D video frame.

With reference to the second aspect, in a possible implementation manner, after the obtaining the first depth image based on the initial depth template and according to the depth transform direction and grouping and clustering results, the method further includes:

obtaining the first depth image by cross bilateral filtering.

With reference to the second aspect, in a possible implementation manner, the determining motion information of the 2D video frame according to a video frame adjacent to the 2D video frame includes:

obtaining a motion vector of each pixel of the 2D video frame by estimation according to the video frame adjacent to the 2D video frame; and obtaining motion information of each pixel according to the motion vector of each pixel.

With reference to the second aspect, in a possible implementation manner, the determining a second depth image of the 2D video frame according to the motion information includes:

obtaining depth information of each pixel according to the motion information of each pixel; and obtaining the second depth image of the 2D video frame according to the depth information of each pixel.

With reference to the second aspect, in a possible implementation manner, the generating, according to the first depth image, the second depth image, and the 2D video frame, a 3D video frame corresponding to the 2D video frame includes:

merging the first depth image and the second depth image to generate a third depth image of the 2D video frame; and generating, according to the third depth image and the 2D video frame, the 3D video frame corresponding to the 2D video frame.

To solve the foregoing technical problem, according to another embodiment of the present invention, in a third aspect, an image frame conversion apparatus is provided and includes:

a first extracting module, configured to extract a longest line segment of a 2D image frame;

a first determining module, connected to the first extracting module, and configured to determine a first depth image of the 2D image frame according to a direction of the longest line segment; and a first generating module, connected to the first determining module, and configured to generate, according to the first depth image and the 2D image frame, a 3D image frame corresponding to the 2D image frame.

With reference to the third aspect, in a possible implementation manner, the first extracting module includes:

a first bilateral filtering processing unit, configured to perform smooth denoising on the 2D image frame by bilateral filtering; and a first extracting unit, connected to the first bilateral filtering processing unit, and configured to detect the bilaterally filtered 2D image frame by using a Hough transform technology, so as to extract the longest line segment of the 2D image frame.

With reference to the third aspect, in a possible implementation manner, the first determining module includes:

a first depth transform direction determining unit, configured to determine, according to the direction of the longest line segment, a depth transform direction of an initial depth template corresponding to the 2D image frame;

a first block dividing unit, configured to divide the bilaterally filtered 2D image frame into blocks, and group and cluster block division results; and a first determining unit, connected to the first depth transform direction determining unit and the first block dividing unit, and configured to obtain the first depth image based on the initial depth template and according to the depth transform direction and grouping and clustering results.

With reference to the third aspect, in a possible implementation manner, the first depth transform direction determining unit is configured to:

establish a plane rectangular coordinate system by using any point in the bilaterally filtered 2D image frame as an origin, a horizontal rightward direction of the bilaterally filtered image frame as a positive direction of an x-axis, and a vertical downward direction thereof as a positive direction of a y-axis;

if an angle between the longest line segment towards a clockwise direction and the positive direction of the x-axis falls within a first range of (112.5°, 157.5°) or (292.5°, 337.5°), determine that the depth transform direction is a gradient direction of transform from lower left to upper right of the bilaterally filtered 2D image frame;

if the angle between the longest line segment towards the clockwise direction and the positive direction of the x-axis falls within a second range of (22.5°, 67.5°) or (202.5°, 247.5°), determine that the depth transform direction is a gradient direction of transform from lower right to upper left of the bilaterally filtered 2D image frame; and if the angle between the longest line segment towards the clockwise direction and the positive direction of the x-axis does not fall within the first range and second range, determine that the depth transform direction is a gradient direction of transform from bottom to top of the bilaterally filtered 2D image frame.

With reference to the third aspect, in a possible implementation manner, the apparatus further includes:

a first cross bilateral filtering module, configured to obtain the first depth image by cross bilateral filtering.

To solve the foregoing technical problem, according to another embodiment of the present invention, in a fourth aspect, a video frame conversion apparatus is provided and includes:

a second extracting module, configured to extract a longest line segment of a 2D video frame;

a second determining module, connected to the second extracting module, and configured to determine a first depth image of the 2D video frame according to a direction of the longest line segment;

a third determining module, configured to determine motion information of the 2D video frame according to a video frame adjacent to the 2D video frame; and configured to determine a second depth image of the 2D video frame according to the motion information; and a second generating module, connected to the second determining module and the third determining module, and configured to generate, according to the first depth image, the second depth image, and the 2D video frame, a 3D video frame corresponding to the 2D video frame.

With reference to the fourth aspect, in a possible implementation manner, the second extracting module includes:

a second bilateral filtering processing unit, configured to perform smooth denoising on the 2D video frame by bilateral filtering; and a second extracting unit, connected to the second bilateral filtering processing unit, and configured to detect the bilaterally filtered 2D video frame by using a Hough transform technology, so as to extract the longest line segment of the 2D video frame.

With reference to the fourth aspect, in a possible implementation manner, the second determining module includes:

a second depth transform direction determining unit, configured to determine, according to the direction of the longest line segment, a depth transform direction of an initial depth template corresponding to the 2D video frame;

a second block dividing unit, configured to divide the bilaterally filtered 2D video frame into blocks, and group and cluster block division results; and a second determining unit, connected to the second depth transform direction determining unit and the second block dividing unit, and configured to obtain the first depth image based on the initial depth template and according to the depth transform direction and grouping and clustering results.

With reference to the fourth aspect, in a possible implementation manner, the second depth transform direction determining unit is configured to:

establish a plane rectangular coordinate system by using any point in the bilaterally filtered 2D video frame as an origin, a horizontal rightward direction of the bilaterally filtered video frame as a positive direction of an x-axis, and a vertical downward direction thereof as a positive direction of a y-axis;

if an angle between the longest line segment towards a clockwise direction and the positive direction of the x-axis falls within a first range of (112.5°, 157.5°) or (292.5°, 337.5°), determine that the depth transform direction is a gradient direction of transform from lower left to upper right of the bilaterally filtered 2D video frame;

if the angle between the longest line segment towards the clockwise direction and the positive direction of the x-axis falls within a second range of (22.5°, 67.5°) or (202.5°, 247.5°), determine that the depth transform direction is a gradient direction of transform from lower right to upper left of the bilaterally filtered 2D video frame; and if the angle between the longest line segment towards the clockwise direction and the positive direction of the x-axis does not fall within the first range and second range, determine that the depth transform direction is a gradient direction of transform from bottom to top of the bilaterally filtered 2D video frame.

With reference to the fourth aspect, in a possible implementation manner, the video frame conversion apparatus further includes:

a second cross bilateral filtering module, configured to obtain the first depth image by cross bilateral filtering.

With reference to the fourth aspect, in a possible implementation manner, the third determining module is configured to:

determine a motion vector of each pixel of the 2D video frame according to the video frame adjacent to the 2D video frame; and obtain motion information of each pixel according to the motion vector of each pixel.

With reference to the fourth aspect, in a possible implementation manner, the third determining module is further configured to:

obtain depth information of each pixel according to the motion information of each pixel; and determine the second depth image of the 2D video frame according to the depth information of each pixel.

With reference to the fourth aspect, in a possible implementation manner, the second generating module is configured to:

merge the first depth image and the second depth image to generate a third depth image of the 2D video frame; and generate, according to the third depth image and the 2D video frame, the 3D video frame corresponding to the 2D video frame.

Beneficial Effect

The image frame conversion method and video frame conversion method and apparatus in the embodiments of the present invention can accurately estimate, according to a direction of an extracted longest line segment, depth information of the 2D image frame based on a relative height cue, so that a depth image generated according to the depth information is more realistic, and a 3D image obtained by conversion is more realistic and natural. The video frame conversion method and video frame conversion method and apparatus of the embodiments of the present invention can accurately estimate, according to a direction of the longest line segment, depth information of the 2D video frame based on a relative height cue and motion information of the 2D video frame, estimate depth information of the 2D video frame based on a motion cue, and synthesize a depth image by merging the depth information based on the relative height cue and the depth information based on the motion cue. In this way, in comparison with synthesizing a depth image by using only a depth cue, the method and apparatus have higher reliability and can preserve good depth edge information, so that the generated depth image is more realistic, and a 3D video frame obtained by conversion is realistic and natural, which facilitates improving user experience.

According to the following detailed description of exemplary embodiments with reference to accompanying drawings, other characteristics and aspects of the present invention will become clear.

BRIEF DESCRIPTION OF DRAWINGS

Accompanying drawings included in the specification and constructing a part of the specification jointly show the exemplary embodiments, characteristics and aspects of the present invention, and are intended to explain the principles of the present invention.

DESCRIPTION OF EMBODIMENTS

The following describes, with reference to the accompanying drawings, various exemplary embodiments, features, and aspects of the present invention in detail. A same mark in the accompanying drawings indicates a same function or a similar component. Though various aspects of the embodiments are shown in the accompanying drawings, unless otherwise specified, the accompanying drawings do not need to be drawn proportionally.

The specific term "exemplary" herein means "used as an example, embodiment or illustrative". Any embodiment described as "exemplary" is not necessarily explained as being superior or better than other embodiments.

In addition, for better description of the present invention, a lot of specific details are provided in the following specific implementation manners. Persons of ordinary skill in the art should understand that the present invention may also be implemented without the specific details. In some embodiments, common methods, means, components, and circuits are not described in detail for the convenience of highlighting the major idea of the present invention.

As described in the background and summary of the invention, the method of the present application is a depth image based 3D synthesis technology. In this technology, analysis is mainly performed on depth cues existing in a 2D image or video, such as motion parallax, focusing/defocusing, linear perspective, atmospheric scattering, shadow, blocking, relative height, and relative size, and depth information in the 2D image or video is estimated, and therefore, a corresponding depth image is generated according to the estimated depth information. A key point for generating the depth image corresponding to the 2D image or video lies in whether the estimated depth information is accurate. Therefore, the present application proposes an image frame conversion method based on relative height information. According to the image frame conversion method, a 2D image frame may be converted into a 3D image frame, and therefore, a corresponding 3D image is generated. And on this basis, a video frame conversion method based on relative height information and motion information is proposed. According to the video frame conversion method, a 2D video frame is converted into a 3D video frame, and therefore, a corresponding 3D video is generated. For detailed description of the two methods, reference may be made to the following description of embodiments.

Embodiment 1

Figure 1:
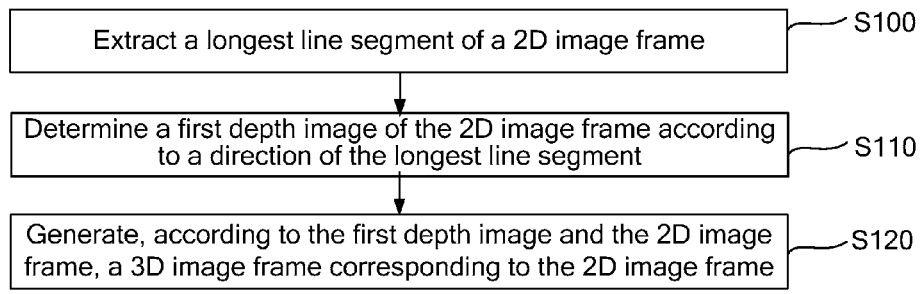
FIG. 1 shows a flowchart of an image frame conversion method according to an embodiment of the present invention.

FIG. 1 shows a flowchart of an image frame conversion method according to an embodiment of the present invention. As shown in FIG. 1, the method may mainly include:

Step S100: Extract a longest line segment of a 2D image frame.

Step S110: Determine a first depth image of the 2D image frame according to a direction of the longest line segment.

Step S120: Generate, according to the first depth image and the 2D image frame, a 3D image frame corresponding to the 2D image frame.

According to the image frame conversion method in this embodiment of the present invention, first, a longest line segment of the 2D image frame is extracted; then, a first depth image of the 2D image frame is determined according to a direction of the longest line segment; and finally, a 3D image frame corresponding to the 2D image frame is generated according to the first depth image and the 2D image frame.

The image frame conversion method provided by this embodiment of the present invention is a method for estimating depth information of the 2D image frame based on a relative height cue. The method can accurately estimate, according to a direction of an extracted longest line segment, depth information of the 2D image frame based on a relative height cue, so that a depth image generated according to the depth information is more realistic, and a 3D image obtained by conversion is more realistic and natural.

Embodiment 2

Figure 2:
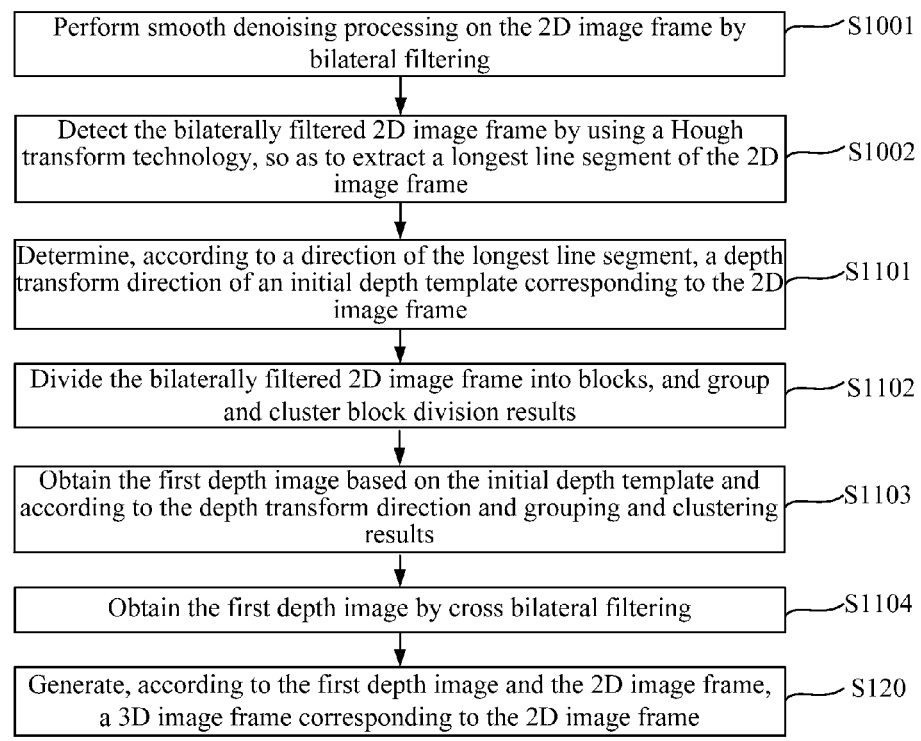
FIG. 2 shows a flowchart of an image frame conversion method according to another embodiment of the present invention.

FIG. 2 shows a flowchart of an image frame conversion method according to another embodiment of the present invention. Steps with same reference numbers in FIG. 1 and FIG. 2 have same functions. For brevity, detailed description of those steps is omitted.

As shown in FIG. 2, a main difference between the image frame conversion method shown in FIG. 2 and the image frame conversion method shown in FIG. 1 is that the foregoing step S100 may specifically include the following steps:

Step S1001: Perform smooth denoising on the 2D image frame by bilateral filtering.

Step S1002: Detect the bilaterally filtered 2D image frame by using a Hough transform technology, so as to extract the longest line segment of the 2D image frame.

In the foregoing step S1001, for an image frame $I_f$, smooth denoising is first performed on the image frame $I_f$, so as to reduce noise and irregular edges and preserve a longest line segment in the image frame $I_f$. In a possible implementation manner, a formula thereof is shown in (1):

$$I_{filtered}(x_i) = \frac{1}{N(x_i)} \sum_{x_j \subset \Omega(x_i)} e^{-0.5\left(\frac{|x_j-x_i|^2}{\sigma_d^2} + \frac{|u(x_j)-u(x_i)|^2}{\sigma_c^2}\right)} I_{org}(x_j) \quad (1)$$

$$N(x_i) = \sum_{x_j \subset \Omega(x_i)} e^{-0.5\left(\frac{|x_j-x_i|^2}{\sigma_d^2} + \frac{|u(x_j)-u(x_i)|^2}{\sigma_c^2}\right)}$$

where, $u(x_i)$ indicates a density value of a pixel $x_i$; $\Omega(x_i)$ indicates a neighborhood window of the pixel $x_i$, and preferably, a window size may be 6×6; $N(x_i)$ indicates a normalization coefficient for filtering; $I_{org}$, $I_{filtered}$ are respectively an original image frame and a filtered image frame; $\sigma_d, \sigma_c$ are respectively standard deviations of distances and gray values, and preferably, values thereof may be respectively 15 and 30.

In the foregoing step S1002, the Hough transform technology is used to detect the filtered image frame $I_{filtered}$ to obtain the longest line segment of the filtered image frame $I_{filtered}$. Hough transform is one of basic methods for identifying a geometrical shape from an image during image processing. Its basic principle lies in duality of points and lines. In a plane rectangular coordinate system (x–y), a straight line may be indicated by using an equation y=kx+b. For a determined point $(x_0, y_0)$ on the straight line, $y_0=kx_0+b$, which indicates a straight line in a parameter plane (k–b). Therefore, one point in an image corresponds to one straight line in the parameter plane, and one straight line in the image corresponds to one point in the parameter plane. Hough transform is performed on all points in the image frame $I_f$, and finally the longest line segment to be detected definitely corresponds to a point at which most straight lines in the parameter plane intersect. In this way, a longest line segment in the image frame $I_{filtered}$ may be detected. All points of a straight line are presented in an original coordinate system, and slopes and intercepts of all the points are the same, that is, all the points correspond to a same point in a parameter coordinate system. In this way, after edge detection is performed on the image frame $I_{filtered}$ by using a Canny operator (proposed by John F. Canny in 1986) and each detected edge point is projected to the parameter coordinate system, focus points existing in the parameter coordinate system are screened, and a line segment corresponding to a focus point at which most straight lines intersect in the original coordinate system is used as a longest line segment L.

In a possible implementation manner, the foregoing step S110 may specifically include the following steps:

Step S1101: Determine, according to the direction of the longest line segment, a depth transform direction of an initial depth template corresponding to the 2D image frame.

Step S1102: Divide the bilaterally filtered 2D image frame into blocks, and group and cluster block division results.

Step S1103: Obtain the first depth image based on the initial depth template and according to the depth transform direction and grouping and clustering results.

In the foregoing step S1101, the direction of the longest line segment L may be determined according to a slope of the longest line segment L extracted from the image frame $I_{filtered}$, and values of $W_{rl}, W_{ud}$ may be determined according to the direction of the longest line segment L, where $W_{rl}, W_{ud}$ are used to control the depth transform direction of the initial depth template.

In a possible implementation manner, the foregoing step S1101 may specifically include:

establishing a plane rectangular coordinate system by using any point in the bilaterally filtered 2D image frame as an origin, a horizontal rightward direction of the bilaterally filtered 2D image frame as a positive direction of an x-axis, and a vertical downward direction thereof as a positive direction of a y-axis; if an angle between the longest line segment towards a clockwise direction and the positive direction of the x-axis falls within a first range of (112.5°, 157.5°) or (292.5°, 337.5°), determining that the depth transform direction is a gradient direction of transform from lower left to upper right of the bilaterally filtered 2D image frame; if the angle between the longest line segment towards the clockwise direction and the positive direction of the x-axis falls within a second range of (22.5°, 67.5°) or (202.5°, 247.5°), determining that the depth transform direction is a gradient direction of transform from lower right to upper left of the bilaterally filtered 2D image frame; and if the angle between the longest line segment towards the clockwise direction and the positive direction of the x-axis does not fall within the first range and second range, determining that the depth transform direction is a gradient direction of transform from bottom to top of the bilaterally filtered 2D image frame.

In the foregoing step S1102, the image frame $I_{filtered}$ may be divided into blocks, for example, may be divided into 4*4 small blocks, and these small blocks are used as vertexes of the image. Absolute values of mean differences between the small blocks are used as edges, and then a minimum spanning tree is constructed by using a principle of the minimum spanning tree and Kruskal (Kruskal) algorithm, that is, a shortest edge is used to connect all the vertexes. Then, grouping and clustering are performed on the image frame after block division by setting a threshold T for the edges. If a value of an edge between two vertexes is greater than the threshold T, the two vertexes do not belong to one cluster. If the value is less than the threshold T, the two vertexes belong to one cluster. Preferably, the threshold T is set to 3.5.

In the foregoing step S1103, for clustering results obtained in the foregoing step, in a possible implementation manner, a depth value, which is determined by $W_{rl}$ and $W_{ud}$, of the initial depth template in a coordinate position (i, j), may be obtained according to (2).

$$\text{Depth}(i,j) = 128 + 255\left(W_{rl}\frac{i-w/2}{w} + W_{ud}\frac{j-h/2}{h}\right) \quad (2)$$

$$|W_{rl}| + |W_{ud}| = 1$$

$$i \in [0, w), j \in [0, h)$$

where, Depth(i, j) indicates the depth value, which is determined by $W_{rl}$ and $W_{ud}$, of the initial depth template in the coordinate position (i, j), where w and h are respectively a width and height of the image frame.

In a possible implementation manner, according to (3), a depth mean value of each block area may be obtained, where the depth mean value is assigned to a template area corresponding to the block area, and therefore, an initial depth image based on relative height information, namely, a first depth image $D_i$, is obtained.

$$D_i(i,j) = \frac{\sum_{x,y \in R} \text{Depth}(x,y)}{\text{pixel\_num}(R)} \quad (3)$$

$$i, j \in R$$

where, $D_i$ is the initial depth image based on the relative height information, R is each clustering result obtained based on division of the minimum spanning tree, Depth(x, y) indicates a depth value of the initial depth template in a coordinate (x, y), and pixel num(R) indicates the number of pixels in the clustering result R. In other words, the depth value, of the first depth image based on the relative height information, in the coordinate position (i, j), is a mean value of depth values, of all pixels within the divided area R in which the depth values are located, in the initial depth template.

In a possible implementation manner, after step S1103, the foregoing step S110 may further include step S1104.

Step S1104: Obtain the first depth image by cross bilateral filtering.

Specifically, because of a block division operation of division by using the minimum spanning tree in the foregoing step S1102, a block effect exists in the obtained first depth image $D_i$. To eliminate the block effect, in a possible implementation manner, a cross bilateral filtering formula (4) is used to process the first depth image.

$$D_h(x_i) = \frac{1}{N(x_i)} \sum_{x_j \subset \Omega(x_i)} e^{-0.5\left(\frac{|x_j-x_i|^2}{\sigma_d^2} + \frac{|u(x_j)-u(x_i)|^2}{\sigma_c^2}\right)} D_i(x_j) \quad (4)$$

$$N(x_i) = \sum_{x_j \subset \Omega(x_i)} e^{-0.5\left(\frac{|x_j-x_i|^2}{\sigma_d^2} + \frac{|u(x_j)-u(x_i)|^2}{\sigma_c^2}\right)}$$

where, $u(x_i)$ indicates a density value of a pixel $x_i$; indicates a neighborhood window of the pixel $x_i$, and preferably, a window size may be 15×15; $N(x_i)$ indicates a normalization coefficient for filtering; $D_h$ is the first depth image processed by cross bilateral filtering; $\sigma_d$, $\sigma_c$ are respectively standard deviations of distances and gray values, and preferably, values thereof may be respectively 12 and 0.05; $x_j$ indicates a pixel in the neighborhood window $\Omega(x_i)$ of the pixel $x_i$.

After the first depth image $D_h$ processed by cross bilateral filtering is obtained, a virtual left view and right view may be generated according to the first depth image $D_h$ and the original image frame by using a depth image based rendering technology. For each generated virtual view, a position (u,v) of each pixel thereof is obtained by projecting and mapping the original image according to a depth value. In a possible implementation manner, a formula for obtaining the left view and right view by mapping is shown in (5):

$$X_l = X_c + \left(\frac{b}{2}\right)f/Z, \; X_r = X_c - \left(\frac{b}{2}\right)f/Z, \quad (5)$$

where, Z is a depth value of the image point (u,v), f is a focal length, b is a baseline of the two left and right views, and $X_c$, $X_l$, $X_r$ are respectively positions of the point (u,v) in the original image, left view, and right view.

In the left view and right view obtained by projecting and mapping, because of depth discontinuity at edges, holes often appear at the edges of the generated virtual left view and right view, that is, pixels without information. In a possible implementation manner, background pixels may be used to fill those holes, as shown in a formula (6):

$$s(x,y) = \frac{\sum_{v=-w}^{v=w}\left\{\sum_{u=-w}^{u=w} s(x-u, y-v) \times \text{non\_hole}(x-u, y-v)\right\}}{\sum_{v=-w}^{v=w}\left\{\sum_{u=-w}^{u=w} \text{non\_hole}(x-u, y-v)\right\}} \quad (6)$$

$$\text{non\_hole}(x,y) = \begin{cases} 0, & \text{if the coordinate position } (x,y) \text{ is in a hole} \\ 1, & \text{if the coordinate position } (x,y) \text{ is not in a hole} \end{cases}$$

where, s(x, y) indicates a pixel value of the coordinate position (x, y) in the image, w indicates a size of a window for filling a hole, values of u and v fall within a range of [−w, w], and non_hole(x, y) is used to mark whether a pixel in the coordinate position (x, y) in the image is a hole, where a value 0 indicates that the pixel in the position is a hole, and a value 1 indicates that the pixel in the position is not a hole, and that only a non-hole pixel in the window w is used to fill a hole.

For the generated virtual left view and right view, a red channel is used for the left view, and a green channel and a blue channel are used for the right view. The three channels are merged, and finally a 3D view in a red-blue format may be obtained. Therefore, a 2D image frame is converted into a 3D image frame, that is, a 2D image is converted into a 3D image.

In the image frame conversion method in this embodiment of the present invention, depth information of the 2D image frame can be estimated based on a relative height cue, and therefore, a depth image of the 2D image frame is restored according to the estimated depth information of the 2D image frame, and the 2D image frame is converted into a 3D image frame. In the method, first, the bilaterally filtered 2D image frame may be detected by using a Hough transform technology, so that a longest line segment of the 2D image frame is extracted; then, a depth transform direction of an initial depth template corresponding to the 2D image frame is determined according to a direction of the longest line segment, that is, depth information of the 2D image frame based on a relative height cue is accurately estimated, and the bilaterally filtered 2D image frame is divided into blocks, and the blocks are grouped and clustered; then, a depth image of the 2D image frame is obtained based on the initial depth template and according to the depth transform direction and grouping and clustering results; and finally, the 2D image frame is converted into a 3D image according to the depth image of the 2D image frame and the 2D image frame. The image frame conversion method provided by this embodiment of the present invention can accurately estimate, according to the direction of the longest line segment, depth information of the 2D image frame based on a relative height cue, so that a depth image generated according to the depth information is more realistic, and a 3D image obtained by conversion is realistic and natural.

Embodiment 3

Figure 3:
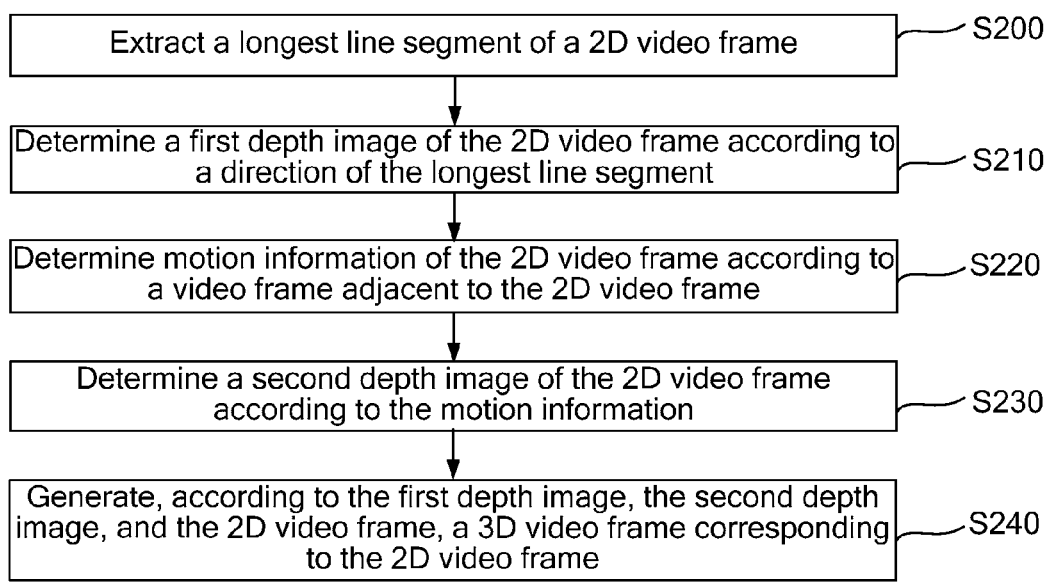
FIG. 3 shows a flowchart of a video frame conversion method according to an embodiment of the present invention.

FIG. 3 shows a flowchart of a video frame conversion method according to an embodiment of the present invention. As shown in FIG. 3, the method may mainly include:

Step S200: Extract a longest line segment of a 2D video frame.

Step S210: Determine a first depth image of the 2D video frame according to a direction of the longest line segment.

Step S220: Determine motion information of the 2D video frame according to a video frame adjacent to the 2D video frame.

Step S230: Determine a second depth image of the 2D video frame according to the motion information.

Step S240: Generate, according to the first depth image, the second depth image, and the 2D video frame, a 3D video frame corresponding to the 2D video frame.

The video frame conversion method in this embodiment of the present invention is a video frame conversion method based on relative height information and motion information. First, a first depth image of the 2D video frame is determined by extracting a longest line segment of the 2D video frame and according to a direction of the longest line segment, that is, background depth information of the 2D video frame is estimated based on relative height information, and a depth image of a background area of the 2D video frame may be generated by using the background depth information. Then, motion information of the 2D image frame is estimated according to a video frame adjacent to the 2D video frame, and a second depth image of the 2D video frame is obtained according to the motion information, that is, motion depth information of the 2D video frame is estimated based on the motion information, and a motion depth image of the 2D video frame may be generated by using the motion depth information. Finally, a depth image of the 2D video frame may be obtained by merging the obtained depth image of the background area and the motion depth image. The video frame conversion method provided by this embodiment of the present invention can accurately estimate, according to a direction of the longest line segment, depth information of the 2D video frame based on a relative height cue and motion information of the 2D video frame, restore depth information of the 2D video frame based on a motion cue, and synthesize a depth image by merging the depth information based on the relative height cue and the depth information based on the motion cue. In this way, in comparison with synthesizing a depth image by using only a depth cue, the method has higher reliability and can preserve good depth edge information, so that the generated depth image is more realistic, and a 3D video frame obtained by conversion is realistic and natural, which facilitates improving user experience.

Embodiment 4

Figure 4:
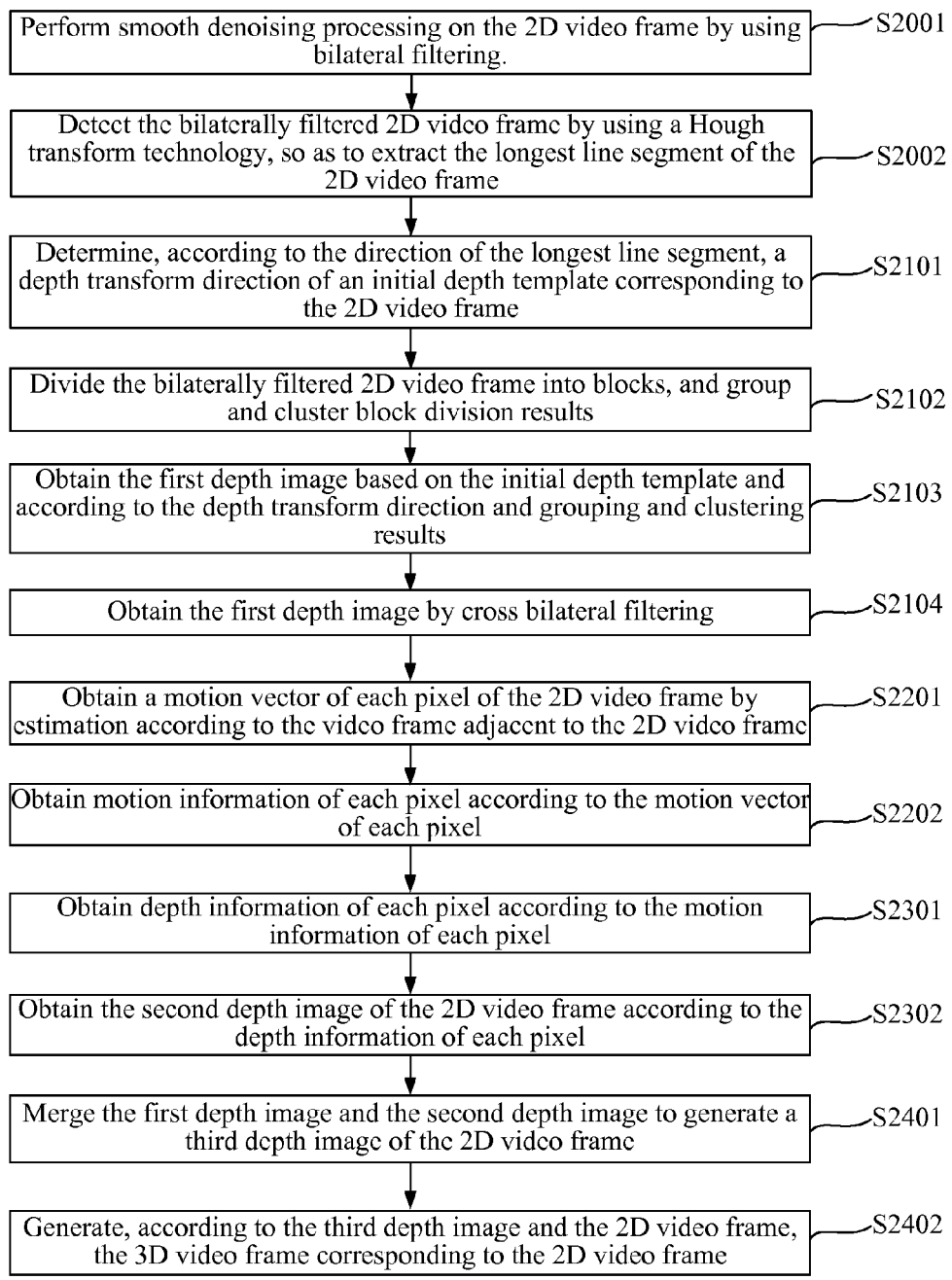
FIG. 4 shows a flowchart of a video frame conversion method according to another embodiment of the present invention.

FIG. 4 shows a flowchart of a video frame conversion method according to another embodiment of the present invention. Steps with same reference numbers in FIG. 3 and FIG. 4 have same functions. For brevity, detailed description of those steps is omitted.

As shown in FIG. 4, a main difference between the video frame conversion method shown in FIG. 4 and the video frame conversion method shown in FIG. 3 is that the foregoing step S200 may further specifically include the following steps:

Step S2001: Perform smooth denoising on the 2D video frame by bilateral filtering.

Step S2002: Detect the bilaterally filtered 2D video frame by using a Hough transform technology, so as to extract the longest line segment of the 2D video frame.

In a possible implementation manner, the foregoing step S210 may specifically include the following steps:

Step S2101: Determine, according to the direction of the longest line segment, a depth transform direction of an initial depth template corresponding to the 2D video frame.

Step S2102: Divide the bilaterally filtered 2D video frame into blocks, and group and cluster block division results.

Step S2103: Obtain the first depth image based on the initial depth template and according to the depth transform direction and grouping and clustering results.

In a possible implementation manner, after step S2103, the foregoing step S210 may further include step S2104.

Step S2104: Obtain the first depth image by cross bilateral filtering.

In a possible implementation manner, the foregoing step S2101 may specifically include:

establishing a plane rectangular coordinate system by using any point in the bilaterally filtered 2D video frame as an origin, a horizontal rightward direction of the bilaterally filtered video frame as a positive direction of an x-axis, and a vertical downward direction thereof as a positive direction of a y-axis; if an angle between the longest line segment towards a clockwise direction and the positive direction of the x-axis falls within a first range of (112.5°, 157.5°) or (292.5°, 337.5°), determining that the depth transform direction is a gradient direction of transform from lower left to upper right of the bilaterally filtered 2D video frame; if the angle between the longest line segment towards the clockwise direction and the positive direction of the x-axis falls within a second range of (22.5°, 67.5°) or (202.5°, 247.5°), determining that the depth transform direction is a gradient direction of transform from lower right to upper left of the bilaterally filtered 2D video frame; and if the angle between the longest line segment towards the clockwise direction and the positive direction of the x-axis does not fall within the first range and second range, determining that the depth transform direction is a gradient direction of transform from bottom to top of the bilaterally filtered 2D video frame.

For details about the foregoing steps S2001, S2002, S2101, S2102, S2103, and S2104, reference may be separately made to the description of steps S1001, S1002, S1101, S1102, S1103, and S1104 in the foregoing Embodiment 2.

With reference to the method for obtaining, according to a 2D image frame, a depth image corresponding to the 2D image frame in Embodiment 2, a depth image of a background area corresponding to a 2D video frame, namely, a first depth image $D_h$, may be obtained according to the 2D video frame and based on relative height information.

In a possible implementation manner, the foregoing step S220 may specifically further include the following steps:

Step S2201: Obtain a motion vector of each pixel of the 2D video frame by estimation according to the video frame adjacent to the 2D video frame.

Step S2202: Obtain motion information of each pixel according to the motion vector of each pixel.

In the foregoing step S2201, for two adjacent video frames $I_t$ and $I_{t+1}$, a video frame $I_t$ at a time t is used as a current video frame, and a video frame $I_{t+1}$ at a time t+1 after the video frame $I_t$ is used as a reference frame. In a possible implementation manner, a dense optical flow estimation method, for example, SimpleFlow, may be applied to obtain a motion vector (u, v) of the current video frame L.

In the foregoing step S2202, in a possible implementation manner, a formula (7) may be used to obtain motion information motion of each pixel in the current video frame $I_t$ and a maximum value MaxMotion of motion information of all pixels in the video frame $I_t$:

$$motion(i,j) = \sqrt{u(i,j)^2 + v(i,j)^2}$$

$$MaxMotion = max(motion(i,j))$$

$$i \in [0, width), j \in [0, height) \quad (7)$$

where, motion(i, j) is a motion value of the video frame $I_t$ in a coordinate position (i, j), MaxMotion is the maximum value of the motion information of all the pixels in the video frame $I_t$, u(i, j) and v(i, j) are displacement values of the video frame $I_t$ in the coordinate position (i, j) in a horizontal direction and a vertical position, and width and height are respectively a width and height of the video frame $I_t$.

In a possible implementation manner, the foregoing step S230 may specifically further include the following steps:

Step S2301: Obtain depth information of each pixel according to the motion information of each pixel.

Step S2302: Obtain the second depth image of the 2D video frame according to the depth information of each pixel.

In the foregoing step S2301, according to a value of motion information motion of each pixel, and according to an assumption that an object moving faster is closer to a camera and that an object moving more slowly is farther away from the camera, a depth value is adjusted to a preset depth range of [0,MaxDepth] by using linear transform, that is, a depth value of a position corresponding to the maximum motion information value is MaxDepth Preferably, the depth value may be set to 120. In a possible implementation manner, the depth information value of each pixel may be obtained according to a formula (8):

$$D_m(i,j) = \frac{motion(i,j)}{MaxMotion} MaxDepth \quad (8)$$

where $D_m(i,j)$ is a depth value of the video frame $I_t$ in the coordinate position (i, j).

In the foregoing step S2302, a second depth image based on motion information, namely a depth image $D_m$, of the video frame may be obtained according to the depth information of each pixel.

In a possible implementation manner, the foregoing step S240 may specifically include the following steps:

Step S2401: Merge the first depth image and the second depth image to generate a third depth image of the 2D video frame.

Step S2402: Generate, according to the third depth image and the 2D video frame, the 3D video frame corresponding to the 2D video frame.

In the foregoing step S2401, the first depth image $D_h$ obtained according to relative height information and the second depth image $D_m$ obtained according to motion information are merged according to a weight to obtain a final third depth image D. In the final third depth image D, depth information of a motion part is preserved, and background depth information based on a relative height is added, so that real depth information of the original image may be reflected quite properly. In a possible implementation manner, a formula (9) may be used to synthesize a depth image:

$$D(x,y) = W_m * D_m(x,y) + W_h * D_h(x,y)$$

$$W_m + W_h = 1 \quad (9)$$

It should be noted that $W_m$ is 0.7 by default, and $W_h$ is 0.3. When the motion information is relatively apparent, $W_m$ may be increased properly, and $W_h$ may be decreased, and vice versa.

In step S2402, by using the depth image based rendering technology and in combination with the video frame and the generated corresponding depth image, a virtual left view and right view may be generated. For each generated virtual view, a position (u,v) of each pixel thereof is obtained by projecting and mapping the original image according to a depth value. In a possible implementation manner, a formula for obtaining the left view and right view by mapping is shown in the foregoing formula (5).

In the left view and right view obtained by projecting and mapping, because of depth discontinuity at edges, holes often appear at the edges of the generated virtual left view and right view, that is, pixels without information. In a possible implementation manner, background pixels may be used to fill those holes, as shown in the foregoing formula (6).

For the generated virtual left view and right view, a red channel is used for the left view, and a green channel and a blue channel are used for the right view. The three channels are merged, and finally a 3D view in a red-blue format may be obtained.

It should be noted that in the foregoing embodiment, a 2D video including only one frame is converted into a 3D video. For a 2D video including many frames, all video frames in the 2D video may be converted into corresponding 3D video frames by repeatedly applying the foregoing video frame conversion method, and therefore, the 2D video is converted into a 3D video.

The video frame conversion method provided by this embodiment of the present invention can accurately estimate, according to a direction of the longest line segment, depth information of the 2D video frame based on a relative height cue and motion information of the 2D video frame, estimate depth information of the 2D video frame based on a motion cue, and synthesize a depth image by merging the depth information based on the relative height cue and the depth information based on the motion cue. In this way, in comparison with synthesizing a depth image by using only a depth cue, the method has higher reliability and can preserve good depth edge information, so that the generated depth image is more realistic, and a 3D video frame obtained by conversion is realistic and natural, which facilitates improving user experience.

Embodiment 5

Figure 5:
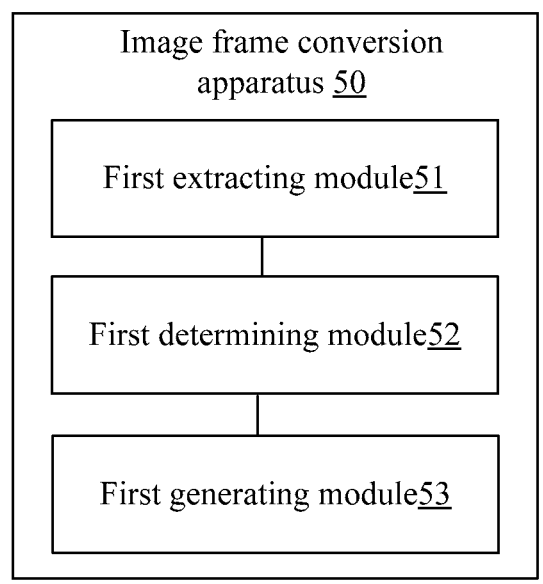
FIG. 5 shows a structural diagram of an image frame conversion apparatus according to an embodiment of the present invention.

FIG. 5 shows a structural diagram of an image frame conversion apparatus according to an embodiment of the present invention. As shown in FIG. 5, the apparatus 50 may mainly include a first extracting module 51, a first determining module 52, and a first generating module 53. The first extracting module 51 is mainly configured to extract a longest line segment of the 2D image frame. The first determining module 52 is connected to the first extracting module 51, and mainly configured to determine a first depth image of the 2D image frame according to a direction of the longest line segment. The first generating module 53 is connected to the first determining module 52, and mainly configured to generate, according to the first depth image and the 2D image frame, a 3D image frame corresponding to the 2D image frame.

According to the image frame conversion apparatus in this embodiment of the present invention, first, a first extracting module extracts a longest line segment of the 2D image frame; then a first determining module determines a first depth image of the 2D image frame according to a direction of the longest line segment; and finally, a first generating module generates, according to the first depth image and the 2D image frame, a 3D image frame corresponding to the 2D image frame. The image frame conversion apparatus provided by this embodiment of the present invention can accurately estimate depth information of the 2D image frame based on a relative height cue, so that a depth image generated according to the depth information is more realistic, and a 3D image obtained by conversion is realistic and natural.

Embodiment 6

Figure 6:
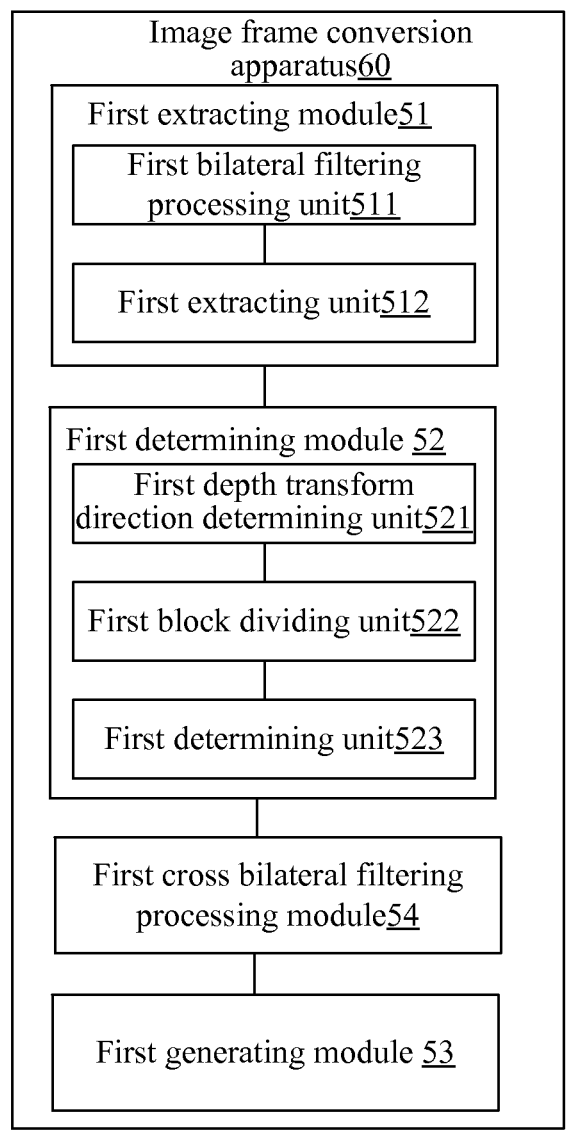
FIG. 6 shows a structural diagram of an image frame conversion apparatus according to another embodiment of the present invention.

FIG. 6 shows a structural diagram of an image frame conversion apparatus according to another embodiment of the present invention. As shown in FIG. 6, a main difference between the image frame conversion apparatus 60 of this embodiment and the image frame conversion apparatus 50 in Embodiment 5 is that the first extracting module 51 may mainly include a first bilateral filtering processing unit 511 and a first extracting unit 512. The first bilateral filtering processing unit 511 is mainly configured to perform smooth denoising on the 2D image frame by bilateral filtering. The first extracting unit 512 is connected to the first bilateral filtering processing unit 511, and mainly configured to detect the bilaterally filtered 2D image frame by using a Hough transform technology, so as to extract the longest line segment of the 2D image frame.

In a possible implementation manner, the first determining module 52 includes a first depth transform direction determining unit 521, a first block dividing unit 522, and a first determining unit 523. The first depth transform direction determining unit 521 is mainly configured to determine, according to the direction of the longest line segment, a depth transform direction of an initial depth template corresponding to the 2D image frame. The first block dividing unit 522 is mainly configured to divide the bilaterally filtered 2D image frame into blocks, and group and cluster block division results. The first determining unit 523 is connected to the first depth transform direction determining unit 521 and the first block dividing unit 522, and mainly configured to obtain the first depth image based on the initial depth template and according to the depth transform direction and grouping and clustering results.

In a possible implementation manner, the first depth transform direction determining unit 521 is configured to: establish a plane rectangular coordinate system by using any point in the bilaterally filtered 2D image frame as an origin, a horizontal rightward direction of the bilaterally filtered 2D image frame as a positive direction of an x-axis, and a vertical downward direction thereof as a positive direction of a y-axis; if an angle between the longest line segment towards a clockwise direction and the positive direction of the x-axis falls within a first range of (112.5°, 157.5°) or (292.5°, 337.5°), determine that the depth transform direction is a gradient direction of transform from lower left to upper right of the bilaterally filtered 2D image frame; if the angle between the longest line segment towards the clockwise direction and the positive direction of the x-axis falls within a second range of (22.5°, 67.5°) or (202.5°, 247.5°), determine that the depth transform direction is a gradient direction of transform from lower right to upper left of the bilaterally filtered 2D image frame; and if the angle between the longest line segment towards the clockwise direction and the positive direction of the x-axis does not fall within the first range and second range, determine that the depth transform direction is a gradient direction of transform from bottom to top of the bilaterally filtered 2D image frame.

In a possible implementation manner, the image frame conversion apparatus 60 further includes a first cross bilateral filtering module 54. The first cross bilateral filtering module 54 is mainly configured to obtain the first depth image by cross bilateral filtering.

The image frame conversion apparatus in this embodiment of the present invention can estimate depth information of the 2D image frame based on a relative height cue, so as to restore a depth image of the 2D image frame according to the estimated depth information of the 2D image frame, and convert the 2D image frame into a 3D image frame. The image frame conversion apparatus provided by this embodiment of the present invention can accurately estimate, according to the direction of the longest line segment, depth information of the 2D image frame based on a relative height cue, so that a depth image generated according to the depth information is more realistic, and a 3D image obtained by conversion is realistic and natural.

Embodiment 7

Figure 7:
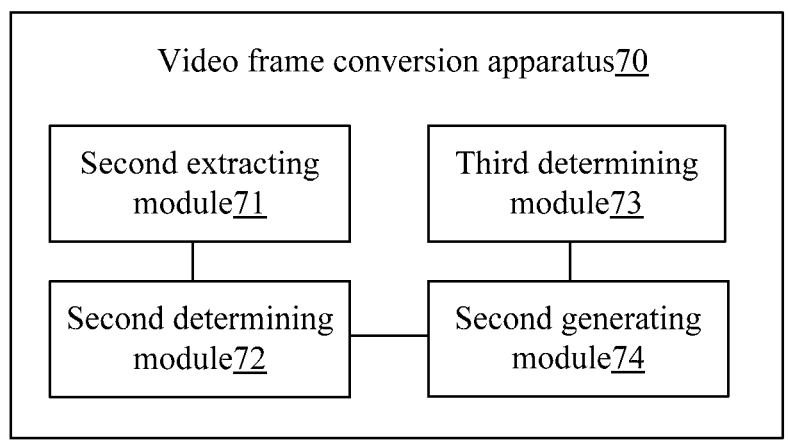
FIG. 7 shows a structural diagram of a video frame conversion apparatus according to an embodiment of the present invention.

FIG. 7 shows a structural diagram of a video frame conversion apparatus according to an embodiment of the present invention. As shown in FIG. 7, a video frame conversion apparatus 70 may mainly include a second extracting module 71, a second determining module 72, a third determining module 73, and a second generating module 74. The second extracting module 71 is mainly configured to extract a longest line segment of a 2D video frame. The second determining module 72 is connected to the second extracting module 71, and mainly configured to determine a first depth image of the 2D video frame according to a direction of the longest line segment. The third determining module 73 is mainly configured to determine motion information of the 2D video frame according to a video frame adjacent to the 2D video frame, and configured to determine a second depth image of the 2D video frame according to the motion information. The second generating module 74 is connected to the second determining module 72 and the third determining module 73, and configured to generate, according to the first depth image, the second depth image, and the 2D video frame, a 3D video frame corresponding to the 2D video frame.

The video frame conversion apparatus in this embodiment of the present invention can accurately estimate, according to a direction of the longest line segment, depth information of the 2D video frame based on a relative height cue and motion information of the 2D video frame, restore depth information of the 2D video frame based on a motion cue, and synthesize a depth image by merging the depth information based on the relative height cue and the depth information based on the motion cue. In this way, in comparison with synthesizing a depth image by using only a depth cue, this solution by using the apparatus has higher reliability and can preserve good depth edge information, so that the generated depth image is more realistic, and a 3D video frame obtained by conversion is realistic and natural, which facilitates improving user experience.

Embodiment 8

Figure 8:
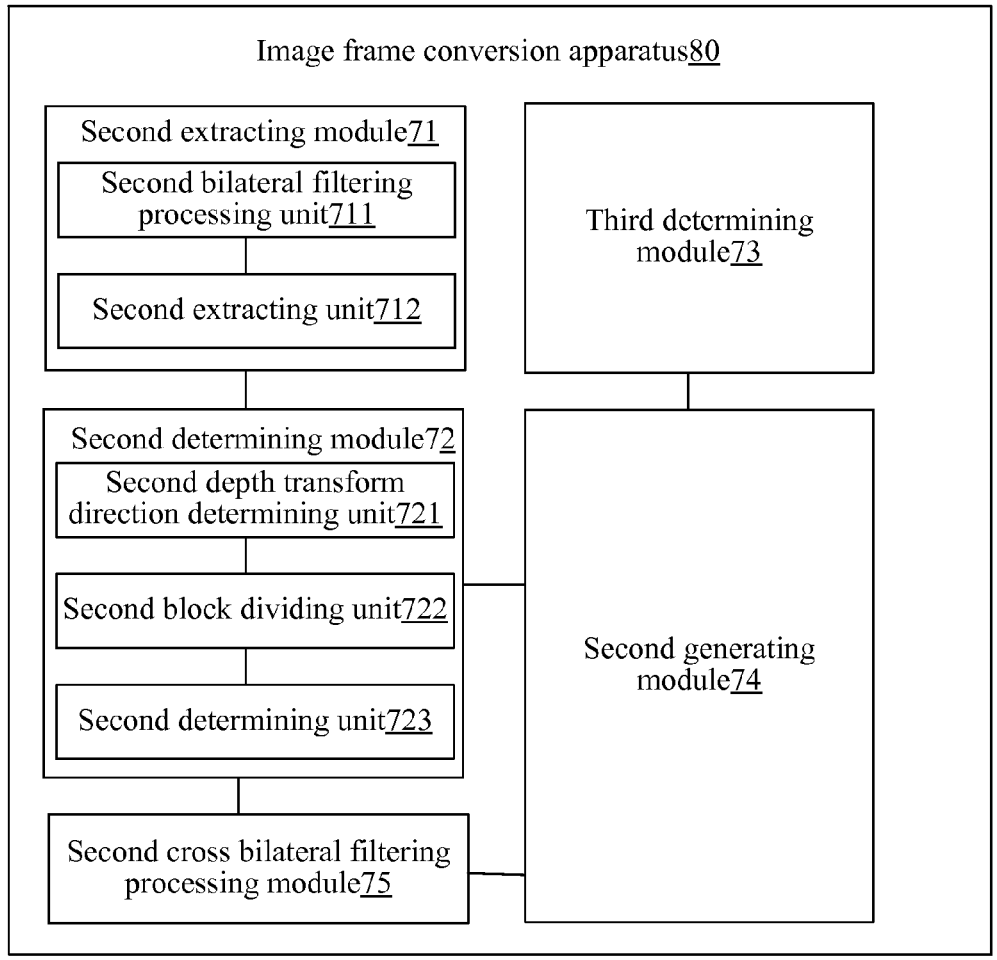
FIG. 8 shows a structural diagram of a video frame conversion apparatus according to another embodiment of the present invention.

FIG. 8 shows a structural diagram of a video frame conversion apparatus according to another embodiment of the present invention. As shown in FIG. 8, a main difference between the video frame conversion apparatus 80 in this embodiment and the video frame conversion apparatus 70 in Embodiment 7 is that the second extracting module 71 includes a second bilateral filtering processing unit 711 and a second extracting unit 712. The second bilateral filtering processing unit 711 is mainly configured to perform smooth denoising on the 2D video frame by bilateral filtering. The second extracting unit 712 is connected to the second bilateral filtering processing unit 711, and mainly configured to detect the bilaterally filtered 2D video frame by using a Hough transform technology, so as to extract the longest line segment of the 2D video frame.

In a possible implementation manner, the second determining module 72 includes a second depth transform direction determining unit 721, a second block dividing unit 722, and a second determining unit 723. The second depth transform direction determining unit 721 is mainly configured to determine, according to the direction of the longest line segment, a depth transform direction of an initial depth template corresponding to the 2D video frame. The second block dividing unit 722 is mainly configured to divide the bilaterally filtered 2D video frame into blocks, and group and cluster block division results. The second determining unit 723 is connected to the second depth transform direction determining unit 721 and the second block dividing unit 722, and configured to obtain the first depth image based on the initial depth template and according to the depth transform direction and grouping and clustering results.

In a possible implementation manner, the second depth transform direction determining unit 721 is mainly configured to: establish a plane rectangular coordinate system by using any point in the bilaterally filtered 2D video frame as an origin, a horizontal rightward direction of the bilaterally filtered video frame as a positive direction of an x-axis, and a vertical downward direction thereof as a positive direction of a y-axis; if an angle between the longest line segment towards a clockwise direction and the positive direction of the x-axis falls within a first range of (112.5°, 157.5°) or (292.5°, 337.5°), determine that the depth transform direction is a gradient direction of transform from lower left to upper right of the bilaterally filtered 2D video frame; if the angle between the longest line segment towards the clockwise direction and the positive direction of the x-axis falls within a second range of (22.5°, 67.5°) or (202.5°, 247.5°), determine that the depth transform direction is a gradient direction of transform from lower right to upper left of the bilaterally filtered 2D video frame; and if the angle between the longest line segment towards the clockwise direction and the positive direction of the x-axis does not fall within the first range and second range, determine that the depth transform direction is a gradient direction of transform from bottom to top of the bilaterally filtered 2D video frame.

In a possible implementation manner, the video frame conversion apparatus 80 further includes a second cross bilateral filtering module 75. The second cross bilateral filtering module 75 is mainly configured to obtain the first depth image by cross bilateral filtering.

In a possible implementation manner, the third determining module 73 is mainly configured to determine a motion vector of each pixel of the 2D video frame according to the video frame adjacent to the 2D video frame, and obtain motion information of each pixel according to the motion vector of each pixel.

In a possible implementation manner, the third determining module 73 is further configured to obtain depth information of each pixel according to the motion information of each pixel, and determine the second depth image of the 2D video frame according to the depth information of each pixel.

In a possible implementation manner, the second generating module 74 is mainly configured to merge the first depth image and the second depth image to generate a third depth image of the 2D video frame, and generate, according to the third depth image and the 2D video frame, the 3D video frame corresponding to the 2D video frame.

The video frame conversion apparatus provided by this embodiment of the present invention can accurately estimate, according to a direction of the longest line segment, depth information of the 2D video frame based on a relative height cue and motion information of the 2D video frame, estimate depth information of the 2D video frame based on a motion cue, and synthesize a depth image by merging the depth information based on the relative height cue and the depth information based on the motion cue. In this way, in comparison with synthesizing a depth image by using only a depth cue, this solution by using the apparatus has higher reliability and can preserve good depth edge information, so that the generated depth image is more realistic, and a 3D video frame obtained by conversion is realistic and natural, which facilitates improving user experience.

Embodiment 9

Figure 9:
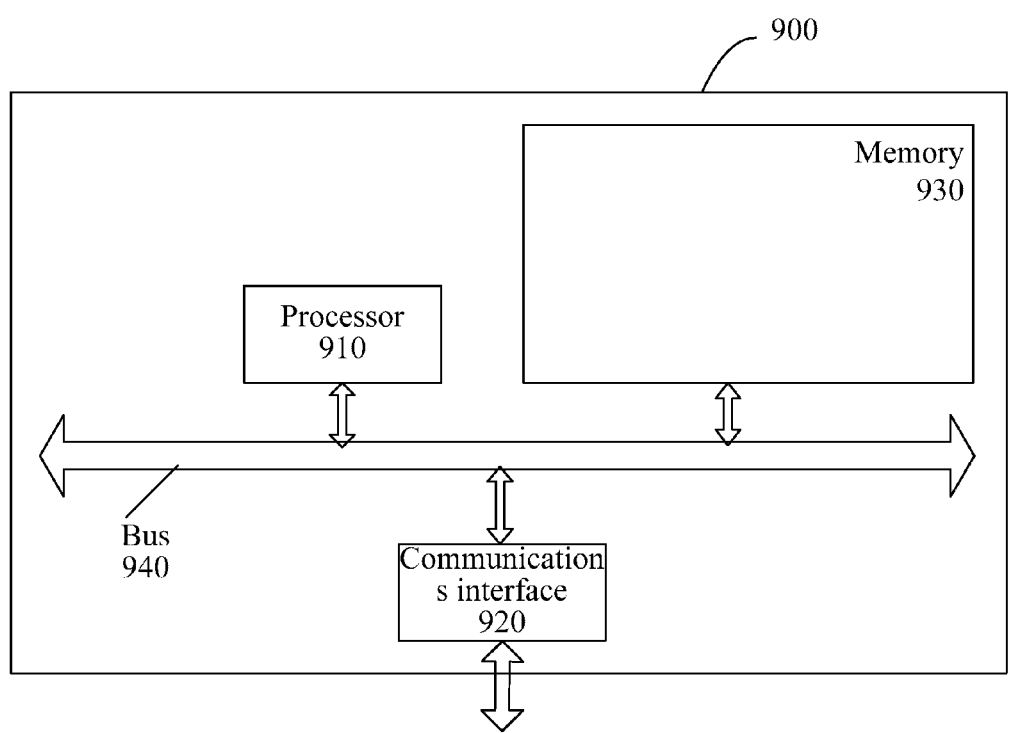
FIG. 9 shows a structural diagram of an image frame conversion apparatus according to another embodiment of the present invention.

FIG. 9 shows a structural diagram of an image frame conversion apparatus according to another embodiment of the present invention. The image frame conversion apparatus 900 may be a host server, a personal computer PC, a portable computer, a terminal, or the like that has a computing capability. Specific implementation of a computing node is not limited in this embodiment of the present invention.

The image frame conversion apparatus 900 includes a processor (processor) 910, a communications interface (Communications Interface) 920, a memory (memory) 930, and a bus 940. The processor 910, the communications interface 920, and the memory 930 implement communication between each other by using the bus 940.

The communications interface 920 is configured to communicate with a network device, where the network device includes, for example, a virtual machine management center and shared storage.

The processor 910 is configured to execute a program. The processor 910 may be a central processing unit CPU or an application specific integrated circuit ASIC (Application Specific Integrated Circuit), or is configured as one or more integrated circuits for implementing this embodiment of the present invention.

The memory 930 is configured to store a file. The memory 930 may include a high-speed RAM memory, and may also include a non-volatile memory (non-volatile memory), for example, at least one magnetic disk memory. The memory 930 may also be a memory array. The memory 930 may also be divided into blocks, and the blocks may be combined into a virtual volume according to a certain rule.

In a possible implementation manner, the foregoing program may be program code including a computer operation instruction. The program may be specifically configured to:

extract a longest line segment of a 2D image frame;

determine a first depth image of the 2D image frame according to a direction of the longest line segment; and generate, according to the first depth image and the 2D image frame, a 3D image frame corresponding to the 2D image frame.

In a possible implementation manner, the extracting a longest line segment of a 2D image frame includes:

performing smooth denoising on the 2D image frame by bilateral filtering; and detecting the bilaterally filtered 2D image frame by using a Hough transform technology, so as to extract the longest line segment of the 2D image frame.

In a possible implementation manner, the determining a first depth image of the 2D image frame according to a direction of the longest line segment includes:

determining, according to the direction of the longest line segment, a depth transform direction of an initial depth template corresponding to the 2D image frame;

dividing the bilaterally filtered 2D image frame into blocks, and grouping and clustering block division results; and obtaining the first depth image based on the initial depth template and according to the depth transform direction and grouping and clustering results.

In a possible implementation manner, the determining, according to the direction of the longest line segment, a depth transform direction of an initial depth template corresponding to the 2D image frame includes:

establishing a plane rectangular coordinate system by using any point in the bilaterally filtered 2D image frame as an origin, a horizontal rightward direction of the bilaterally filtered 2D image frame as a positive direction of an x-axis, and a vertical downward direction thereof as a positive direction of a y-axis;

if an angle between the longest line segment towards a clockwise direction and the positive direction of the x-axis falls within a first range of (112.5°, 157.5°) or (292.5°, 337.5°), determining that the depth transform direction is a gradient direction of transform from lower left to upper right of the bilaterally filtered 2D image frame;

if the angle between the longest line segment towards the clockwise direction and the positive direction of the x-axis falls within a second range of (22.5°, 67.5°) or (202.5°, 247.5°), determining that the depth transform direction is a gradient direction of transform from lower right to upper left of the bilaterally filtered 2D image frame; and if the angle between the longest line segment towards the clockwise direction and the positive direction of the x-axis does not fall within the first range and second range, determining that the depth transform direction is a gradient direction of transform from bottom to top of the bilaterally filtered 2D image frame.

In a possible implementation manner, after the obtaining the first depth image based on the initial depth template and according to the depth transform direction and grouping and clustering results, the program is further configured to:

obtain the first depth image by cross bilateral filtering.

Embodiment 10

Figure 10:
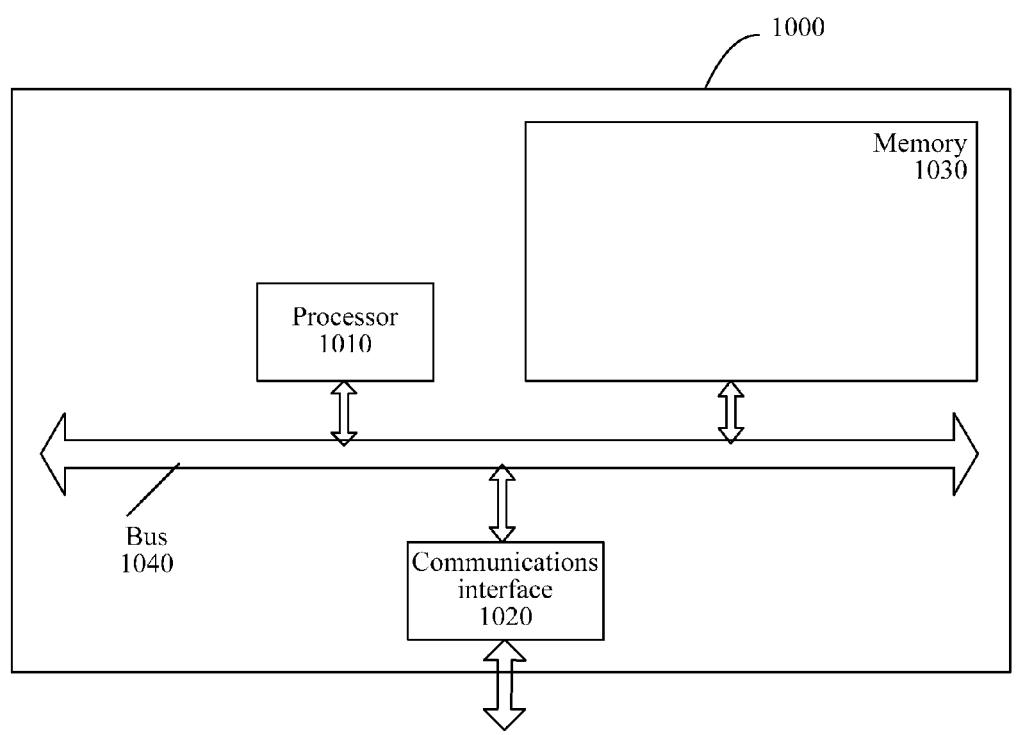
FIG. 10 shows a structural diagram of a video frame conversion apparatus according to another embodiment of the present invention.

FIG. 10 shows a structural diagram of a video frame conversion apparatus according to another embodiment of the present invention. The video frame conversion apparatus 1000 may be a host server, a personal computer PC, a portable computer, a terminal, or the like that has a computing capability. Specific implementation of a computing node is not limited in this embodiment of the present invention.

The video frame conversion apparatus 1000 includes a processor (processor) 1010, a communications interface (Communications Interface) 1020, a memory (memory) 1030, and a bus 1040. The processor 1010, the communications interface 1020, and the memory 1030 implement communication between each other by using the bus 1040.

The communications interface 1020 is configured to communicate with a network device, where the network device includes, for example, a virtual machine management center and shared storage.

The processor 1010 is configured to execute a program. The processor 1010 may be a central processing unit CPU or an application specific integrated circuit ASIC (Application Specific Integrated Circuit), or is configured as one or more integrated circuits for implementing this embodiment of the present invention.

The memory 1030 is configured to store a file. The memory 1030 may include a high-speed RAM memory, and may also include a non-volatile memory (non-volatile memory), for example, at least one magnetic disk memory. The memory 1030 may also be a memory array. The memory 1030 may also be divided into blocks, and the blocks may be combined into a virtual volume according to a certain rule.

In a possible implementation manner, the foregoing program may be program code including a computer operation instruction. The program may be specifically configured to:

extract a longest line segment of a 2D video frame;

determine a first depth image of the 2D video frame according to a direction of the longest line segment;

determine motion information of the 2D video frame according to a video frame adjacent to the 2D video frame;

determine a second depth image of the 2D video frame according to the motion information; and generate, according to the first depth image, the second depth image, and the 2D video frame, a 3D video frame corresponding to the 2D video frame.

In a possible implementation manner, the extracting a longest line segment of a 2D video frame includes:

performing smooth denoising on the 2D video frame by bilateral filtering; and detecting the bilaterally filtered 2D video frame by using a Hough transform technology, so as to extract the longest line segment of the 2D video frame.

In a possible implementation manner, the determining a first depth image of the 2D video frame according to a direction of the longest line segment includes:

determining, according to the direction of the longest line segment, a depth transform direction of an initial depth template corresponding to the 2D video frame;

dividing the bilaterally filtered 2D video frame into blocks, and grouping and clustering block division results; and obtaining the first depth image based on the initial depth template and according to the depth transform direction and grouping and clustering results.

In a possible implementation manner, the determining, according to the direction of the longest line segment, a depth transform direction of an initial depth template corresponding to the 2D video frame includes:

establishing a plane rectangular coordinate system by using any point in the bilaterally filtered 2D video frame as an origin, a horizontal rightward direction of the bilaterally filtered video frame as a positive direction of an x-axis, and a vertical downward direction thereof as a positive direction of a y-axis;

if an angle between the longest line segment towards a clockwise direction and the positive direction of the x-axis falls within a first range of (112.5°, 157.5°) or (292.5°, 337.5°), determining that the depth transform direction is a gradient direction of transform from lower left to upper right of the bilaterally filtered 2D video frame;

if the angle between the longest line segment towards the clockwise direction and the positive direction of the x-axis falls within a second range of (22.5°, 67.5°) or (202.5°, 247.5°), determining that the depth transform direction is a gradient direction of transform from lower right to upper left of the bilaterally filtered 2D video frame; and if the angle between the longest line segment towards the clockwise direction and the positive direction of the x-axis does not fall within the first range and second range, determining that the depth transform direction is a gradient direction of transform from bottom to top of the bilaterally filtered 2D video frame.

In a possible implementation manner, after the obtaining the first depth image based on the initial depth template and according to the depth transform direction and grouping and clustering results, the program is further configured to:

obtain the first depth image by cross bilateral filtering.

With reference to a second aspect, in a possible implementation manner, the determining motion information of the 2D video frame according to a video frame adjacent to the 2D video frame includes:

obtaining a motion vector of each pixel of the 2D video frame by estimation according to the video frame adjacent to the 2D video frame; and obtaining motion information of each pixel according to the motion vector of each pixel.

In a possible implementation manner, the determining a second depth image of the 2D video frame according to the motion information includes:

obtaining depth information of each pixel according to the motion information of each pixel; and obtaining the second depth image of the 2D video frame according to the depth information of each pixel.

In a possible implementation manner, the generating, according to the first depth image, the second depth image, and the 2D video frame, a 3D video frame corresponding to the 2D video frame includes:

merging the first depth image and the second depth image to generate a third depth image of the 2D video frame; and generating, according to the third depth image and the 2D video frame, the 3D video frame corresponding to the 2D video frame.

Persons of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. Persons skilled in the art may select different methods to implement the described functions for a particular application, but it should not be considered that the implementation goes beyond the scope of the present invention.

If the functions are implemented in a form of computer software and are sold or used as independent products, it can be considered to a certain extent that the entire or a part of (for example, the part contributing to the prior art) the technical solution of the present invention is implemented in a form of a computer software product. The computer software product is generally stored in a computer readable storage medium and includes several instructions for instructing a computer device (which may be a personal computer, a server, or a network device, and the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. An image frame conversion method, comprising:
   performing, by an image processing device, a smooth denoising operation on a 2D image frame using bilateral filtering;
   extracting, by an image processing device, a longest line segment of the bilaterally filtered 2D image frame;
   determining, by the image processing device, based on a direction of the longest line segment, a depth transform direction of an initial depth template;
   dividing, by the image processing device, the bilaterally filtered 2D image frame into blocks;
   grouping and clustering, by the image processing device, the blocks;
   obtaining, by the image processing device, a first depth image the initial depth template and the grouping and clustering results;
   performing, by the image processing device, cross bilateral filtering on the first depth image; and
   generating, by the image processing device, based on the cross bilaterally filtered first depth image and the 2D image frame, a 3D image frame corresponding to the 2D image frame.

2. The method according to claim 1, wherein extracting the longest line segment of the 2D image frame utilizes a Hough transform.

3. The method according to claim 1, wherein determining the depth transform direction of the initial depth template comprises:
    establishing a rectangular coordinate system by using a point in the bilaterally filtered 2D image frame as an origin, a horizontal rightward direction relative to the origin as a positive direction of an x-axis, and a vertical downward direction relative to the origin as a positive direction of a y-axis; and
    determining whether the depth transform direction is a gradient direction of transform from lower left to upper right of the bilaterally filtered 2D image frame, lower right to upper left of the bilaterally filtered 2D image frame, or bottom to top of the bilaterally filtered 2D image frame, wherein:
        if an angle between the longest line segment towards a clockwise direction and the positive direction of the x-axis falls within a first range, it is determined that the depth transform direction is a gradient direction of transform from lower left to upper right of the bilaterally filtered 2D image frame;
        if the angle between the longest line segment towards the clockwise direction and the positive direction of the x-axis falls within a second range, it is determined that the depth transform direction is a gradient direction of transform from lower right to upper left of the bilaterally filtered 2D image frame; and
        if the angle between the longest line segment towards the clockwise direction and the positive direction of the x-axis does not fall within the first range and second range, it is determined that the depth transform direction is a gradient direction of transform from bottom to top of the bilaterally filtered 2D image frame.

4. A video frame conversion method, comprising:
    performing, by an image processing device, a smooth denoising operation on a 2D video frame using bilateral filtering;
    extracting, by the image processing device, a longest line segment of the bilaterally filtered 2D video frame;
    determining, by the image processing device, based on a direction of the longest line segment, a depth transform direction of an initial depth template;
    dividing, by the image processing device, the bilaterally filtered 2D video frame into blocks;
    grouping and clustering, by the image processing device, the blocks;
    obtaining, by the image processing device, a first depth image based on the initial depth template and the grouping and clustering results;
    performing, by the image processing device, cross bilateral filtering on the first depth image;
    determining, by the image processing device, motion information corresponding to the 2D video frame based on a video frame adjacent to the 2D video frame;
    determining, by the image processing device, a second depth image corresponding to the 2D video frame based on the motion information; and
    generating, by the image processing device, based on the cross bilaterally filtered first depth image, the second depth image and the 2D video frame, a 3D video frame corresponding to the 2D video frame.

5. The method according to claim 4, wherein extracting the longest line segment of the 2D video frame utilizes a Hough transform.

6. The method according to claim 4, wherein determining the depth transform direction of the initial depth template corresponding to the 2D video frame comprises:
    establishing a rectangular coordinate system by using a point in the bilaterally filtered 2D video frame as an origin, a horizontal rightward direction relative to the origin as a positive direction of an x-axis, and a vertical downward direction relative to the origin as a positive direction of a y-axis; and
    determining whether the depth transform direction is a gradient direction of transform from lower left to upper right of the bilaterally filtered 2D video frame, lower right to upper left of the bilaterally filtered 2D video frame, or bottom to top of the bilaterally filtered 2D video frame, wherein:
        if an angle between the longest line segment towards a clockwise direction and the positive direction of the x-axis falls within a first range, it is determined that the depth transform direction is a gradient direction of transform from lower left to upper right of the bilaterally filtered 2D video frame;
        if the angle between the longest line segment towards the clockwise direction and the positive direction of the x-axis falls within a second range, it is determined that the depth transform direction is a gradient direction of transform from lower right to upper left of the bilaterally filtered 2D video frame; and
        if the angle between the longest line segment towards the clockwise direction and the positive direction of the x-axis does not fall within the first range and second range, it is determined that the depth transform direction is a gradient direction of transform from bottom to top of the bilaterally filtered 2D video frame.

7. The method according to claim 4, wherein determining the motion information corresponding to the 2D video frame comprises:
    obtaining a motion vector of each pixel of the 2D video frame by estimation based on the video frame adjacent to the 2D video frame; and
    obtaining motion information of each pixel based on the motion vector of each pixel.

8. The method according to claim 7, wherein the determining the second depth image comprises:
    obtaining depth information of each pixel of the 2D video frame based on the motion information of each pixel; and
    obtaining the second depth image based on the depth information of each pixel.

9. The method according to claim 4, wherein generating the 3D video frame corresponding to the 2D video frame comprises:
    merging the cross bilaterally filtered first depth image and the second depth image to generate a third depth image of the 2D video frame; and
    generating, further based on the third depth image, the 3D video frame corresponding to the 2D video frame.

10. An image frame conversion apparatus, comprising an image processor and a non-transitory processor-readable medium having processor-executable instructions stored thereon, the processor-executable instructions, when executed by the image processor, facilitating performance of the following:
    performing a smooth denoising operation on a 2D image frame using bilateral filtering;
    extracting a longest line segment of the bilaterally filtered 2D image frame;

determining, based on a direction of the longest line segment, a depth transform direction of an initial depth template;

dividing the bilaterally filtered 2D image frame into blocks;

grouping and clustering the blocks;

obtaining a first depth image based on the initial depth template and the grouping and clustering results;

performing cross bilateral filtering on the first depth image; and generating, based on the cross bilaterally filtered first depth image and the 2D image frame, a 3D image frame corresponding to the 2D image frame.

11. The apparatus according to claim 10, wherein extracting the longest line segment of the 2D image frame utilizes a Hough transform.

12. The apparatus according to claim 10, wherein determining the depth transform direction of the initial depth template comprises:

establishing a rectangular coordinate system by using a point in the bilaterally filtered 2D image frame as an origin, a horizontal rightward direction relative to the origin as a positive direction of an x-axis, and a vertical downward direction relative to the origin as a positive direction of a y-axis; and determining whether the depth transform direction is a gradient direction of transform from lower left to upper right of the bilaterally filtered 2D image frame, lower right to upper left of the bilaterally filtered 2D image frame, or bottom to top of the bilaterally filtered 2D image frame, wherein:

if an angle between the longest line segment towards a clockwise direction and the positive direction of the x-axis falls within a first range, it is determined that the depth transform direction is a gradient direction of transform from lower left to upper right of the bilaterally filtered 2D image frame;

if the angle between the longest line segment towards the clockwise direction and the positive direction of the x-axis falls within a second range, it is determined that the depth transform direction is a gradient direction of transform from lower right to upper left of the bilaterally filtered 2D image frame; and if the angle between the longest line segment towards the clockwise direction and the positive direction of the x-axis does not fall within the first range and second range, it is determined that the depth transform direction is a gradient direction of transform from bottom to top of the bilaterally filtered 2D image frame.

13. A video frame conversion apparatus, comprising an image processor and a non-transitory processor-readable medium having processor-executable instructions stored thereon, the processor-executable instructions, when executed by the image processor, facilitating performance of the following:

performing a smooth denoising operation on a 2D video frame using bilateral filtering;

extracting a longest line segment of the bilaterally filtered 2D video frame;

determining based on a direction of the longest line segment, a depth transform direction of an initial depth template;

dividing the bilaterally filtered 2D video frame into blocks;

grouping and clustering the blocks;

obtaining a first depth image based on the initial depth template and the grouping and clustering results;

performing cross bilateral filtering on the first depth image;

determining motion information corresponding to the 2D video frame based on a video frame adjacent to the 2D video frame;

determining a second depth image corresponding to the 2D video frame based on the motion information; and generating, based on the cross bilaterally filtered first depth image, the second depth image and the 2D video frame, a 3D video frame corresponding to the 2D video frame.

14. The apparatus according to claim 13, wherein extracting the longest line segment of the 2D video frame utilizes a Hough transform.

15. The apparatus according to claim 13, wherein determining the depth transform direction of the initial depth template comprises:

establishing a rectangular coordinate system by using a point in the bilaterally filtered 2D video frame as an origin, a horizontal rightward direction relative to the origin as a positive direction of an x-axis, and a vertical downward direction relative to the origin as a positive direction of a y-axis; and determining whether the depth transform direction is a gradient direction of transform from lower left to upper right of the bilaterally filtered 2D video frame, lower right to upper left of the bilaterally filtered 2D video frame, or bottom to top of the bilaterally filtered 2D video frame, wherein:

if an angle between the longest line segment towards a clockwise direction and the positive direction of the x-axis falls within a first range, it is determined that the depth transform direction is a gradient direction of transform from lower left to upper right of the bilaterally filtered 2D video frame;

if the angle between the longest line segment towards the clockwise direction and the positive direction of the x-axis falls within a second range, it is determined that the depth transform direction is a gradient direction of transform from lower right to upper left of the bilaterally filtered 2D video frame; and if the angle between the longest line segment towards the clockwise direction and the positive direction of the x-axis does not fall within the first range and second range, it is determined that the depth transform direction is a gradient direction of transform from bottom to top of the bilaterally filtered 2D video frame.

16. The apparatus according to claim 13, wherein determining the motion information corresponding to the 2D video frame comprises:

determining a motion vector of each pixel of the 2D video frame based on the video frame adjacent to the 2D video frame; and obtaining motion information of each pixel of the 2D video frame based on the motion vector of each pixel.

17. The apparatus according to claim 16, wherein determining the second depth image comprises:

obtaining depth information of each pixel of the 2D video frame based on the motion information of each pixel; and determining the second depth image based on the depth information of each pixel.

18. The apparatus according to claim 13, wherein generating the 3D video frame corresponding to the 2D video frame comprises:
  merging the cross bilaterally filtered first depth image and the second depth image to generate a third depth image corresponding to the 2D video frame; and
  generating, further based on the third depth image, the 3D video frame corresponding to the 2D video frame.

* * * * *